United States Patent [19]

Howie, Jr.

[11] 4,295,246
[45] Oct. 20, 1981

[54] KNOB

[75] Inventor: Robert K. Howie, Jr., Decatur, Ill.

[73] Assignee: The Grigoleit Company, Decatur, Ill.

[21] Appl. No.: 141,575

[22] Filed: Apr. 18, 1980

[51] Int. Cl.³ .............................................. F16D 1/06
[52] U.S. Cl. ..................................... 16/121; 292/349;
74/553
[58] Field of Search .................... 16/121, 118; 74/553, 74/548; 292/353, 349

[56] References Cited

U.S. PATENT DOCUMENTS

| Re. 18,815 | 5/1933 | DeTar | 403/357 |
|---|---|---|---|
| 1,938,556 | 12/1933 | Danielson . | |
| 1,951,188 | 3/1934 | Flaherty | 292/349 |
| 2,189,845 | 2/1940 | Terrill . | |
| 2,197,140 | 4/1940 | Arvin | 403/356 |
| 2,283,905 | 5/1942 | Beal . | |
| 3,188,124 | 6/1965 | Pestka et al. . | |
| 3,193,312 | 7/1965 | Ehner . | |
| 3,336,059 | 8/1967 | Leitmann | 16/121 X |
| 3,429,199 | 2/1969 | Kenyon . | |
| 3,679,252 | 7/1972 | Howie, Jr. | 292/349 |
| 3,880,534 | 4/1975 | Schmidt . | |
| 3,880,536 | 4/1975 | Petras . | |
| 3,965,529 | 6/1976 | Hadzimahalis . | |
| 3,994,608 | 11/1976 | Swiderski . | |
| 4,179,771 | 12/1979 | Rankins et al. . | |

FOREIGN PATENT DOCUMENTS 1045845 12/1958 Fed. Rep. of Germany .

Primary Examiner—Andrew V. Kundrat
Attorney, Agent, or Firm—Kinzer, Plyer, Dorn & McEachran

[57] ABSTRACT

A molded plastic knob of the type which frictionally engages and slips over the end of a shaft of generally circular cross section and having at least one longitudinally extending flat surface. A hub is formed as part of the knob. A shaft receiving socket is formed in the hub. The socket has a flat wall adapted to engage a flat surface on the shaft. A resilient finger is formed as part of the hub and extends into the socket upwardly from the flat wall. The resilient finger is positioned to engage an arcuate side of the shaft when the shaft is inserted into the socket so as to slightly deform the resilient finger and thereby apply a force to the shaft. The wall of the socket located opposite the flat wall is semi-hexagonal and the resilient finger extends towards but terminates short of the semi-hexagonal wall.

2 Claims, 4 Drawing Figures

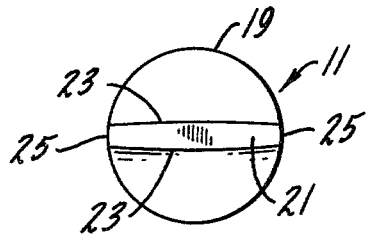
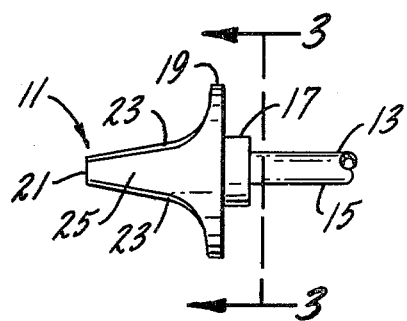
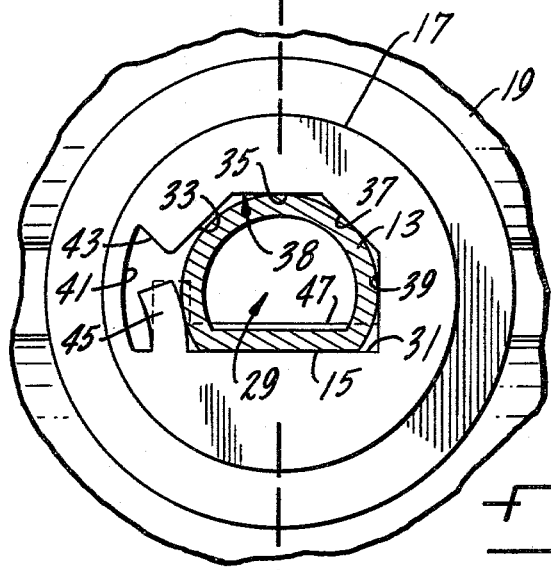
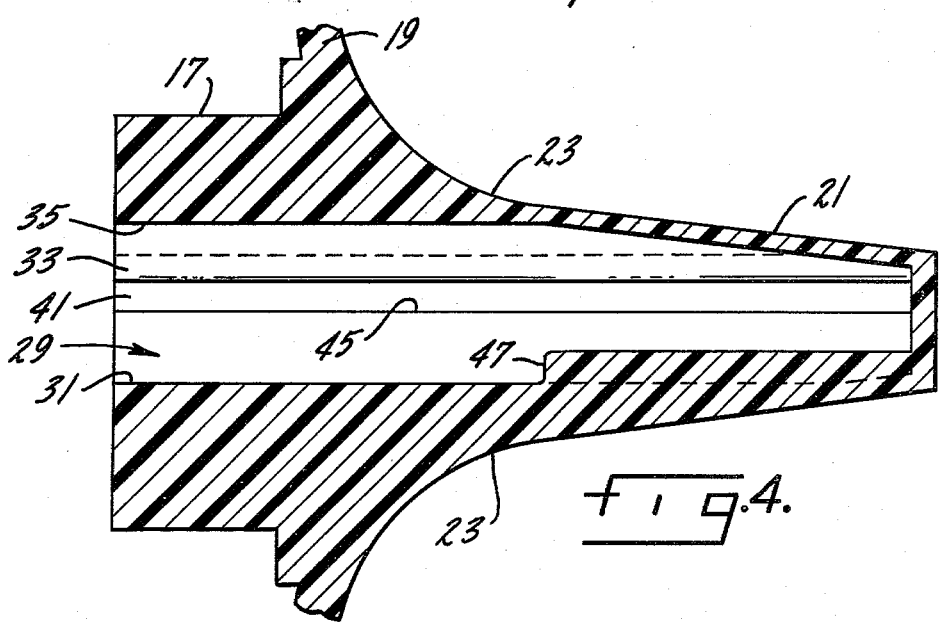

KNOB

BACKGROUND AND SUMMARY OF THE INVENTION

The molded plastic knob of this invention is to be used for the same purposes as the friction fit knobs shown and described in U.S. Pat. Nos. 3,679,252 of Robert K. Howie, Jr. and 4,179,771 of Paul Rankins and Robert K. Howie, Jr., both of which are assigned to the assignee of this application.

This invention is directed to a simplified form of such knob having only one resilient finger.

An object of this invention is a friction fit knob that will maintain a secure friction fit on a shaft even when subjected to torque conditions.

Another object of this invention is a friction fit knob having a resilient force applying member which compensates for variations in the dimensions of the socket.

Another object of this invention is a friction fit knob having a stop means engageable with the shaft to prevent overstressing of the resilient force applying member.

Other objects may be found in the following specification, claims and drawings.

BRIEF DESCRIPTION OF THE DRAWINGS

The invention is illustrated more or less diagrammatically in the following drawings wherein:

FIG. 1 is a top plan view of a knob of this invention;

FIG. 2 is a side elevational view of a knob of this invention mounted on a shaft;

FIG. 3 is an enlarged partial cross-sectional view taken along line 3—3 of FIG. 4; and FIG. 4 is a cross sectional view taken along line 4—4 of FIG. 3.

DESCRIPTION OF THE PREFERRED EMBODIMENT

FIGS. 1 and 2 of the drawings show a molded knob 11 embodying the novel features of this invention mounted on a hollow tubular shaft 13. The shaft is customarily made of metal and can be constructed of a generally circular cross section with one flat side 15. The hollow tubular shaft is only one example of the many types of shafts which can be used with the molded knob of this invention. It should also be understood that such a shaft may be formed as an integral part of the device it operates such as a switch or a valve or the like.

A knob 11 of this invention may be molded from a thermoplastic material such as nylon or any other suitable plastic material. The knob includes a hub 17. A radially extending circular flange 19 is formed integrally with the hub and extends outwardly thereof. A blade or gripping portion 21 is formed on the knob on the opposite side thereof from the hub. This gripping portion has tapered side walls 23 which flair into the flange 19 and generally straight end walls 25 which blend into the flange 19.

The hub 17, which is generally cylindrical in shape has a shaft receiving socket 29 formed therein. The socket, which is of irregular transverse cross section has a flat, longitudinally extending wall 31 on one side thereof. Located opposite the flat wall 31 are three flat surfaces 33, 35 and 37 which form a semi-hexagonal shaped wall 38 which also extends into the socket. Located between the semi-hexagonal wall, particularly surface 37 thereof, and the flat wall 31 is a flat wall 39 which extends generally at right angles to the wall 31. Located opposite to the flat wall 39 is an arcuate wall 41 which extends between the flat wall 31 and an obliquely extending wall 43. The wall 43 connects with the flat surface 33 of the semi-hexagonal wall 38.

A resilient finger 45 extends upwardly from the flat wall 31 and terminates short of the surface 33 of the semi-hexagonal wall 38. The resilient finger 45 is positioned so that it is either closer to or at least the same distance from the center of the socket 29 as the surface 33 of the semi-hexagonal wall 38. The positioning of the resilient finger 45 insures that the shaft will engage the resilient finger even if the shaft also engages the surface 33 so that a force will be exerted against the shaft by the resilient finger 45. This arrangement will compensate for any variations in the dimensions of the shaft 13 and the socket walls. The surface 33 also acts as a stop means or limit which is engaged by the shaft 13 to prevent overstressing of the resilient finger by the shaft. The unstressed position of the resilient finger 45 is shown by the dashed lines in FIG. 3. The stressed or deformed position caused by engagement with the shaft is shown by the solid lines in the same figure.

An abutment 47 is formed inside the socket where the socket reduces in diameter. The abutment 47 limits the distance the shaft 13 can be inserted in the socket.

I claim:

1. A molded knob of the type which frictionally engages and slips over the end of a shaft of generally circular cross section and having at least one longitudinally extending flat surface, a hub formed as part of said knob, a shaft receiving walled socket formed in said hub, said socket having a flat wall adapted to engage a flat surface on said shaft, and a resilient finger formed as part of said hub and extending into the socket from said flat wall, said resilient finger being positioned to engage an arcuate side of said shaft at a location adjacent said flat wall when said shaft is inserted into said socket to slightly deform said resilient finger and thereby apply force to said shaft, and the wall of the socket located opposite the flat wall is a rigid part of a semi-hexagonal walled socket, the circular portion of said shaft engages said semi-hexagonal rigid wall part and said resilient finger extends towards but terminates short of said semi-hexagonal rigid wall part and constitutes a flexible part of said walled socket.

2. The molded knob of claim 1 in which one surface of said semi-hexagonal wall located radially opposite said resilient finger and on the same side of the socket as the finger is engageable with the arcuate side wall of said shaft to limit deformation of said resilient finger.

* * * * *